United States Patent
Tanaka et al.

(10) Patent No.: US 10,953,361 B2
(45) Date of Patent: Mar. 23, 2021

(54) $CO_2$ RECOVERY DEVICE AND RECOVERY METHOD

(71) Applicant: Mitsubishi Heavy Industries Engineering, Ltd., Kanagawa (JP)

(72) Inventors: Hiroshi Tanaka, Tokyo (JP); Takuya Hirata, Tokyo (JP); Takashi Kamijo, Tokyo (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 215 days.

(21) Appl. No.: 16/068,447

(22) PCT Filed: Dec. 12, 2016

(86) PCT No.: PCT/JP2016/086881
§ 371 (c)(1),
(2) Date: Jul. 6, 2018

(87) PCT Pub. No.: WO2017/122478
PCT Pub. Date: Jul. 20, 2017

(65) Prior Publication Data
US 2019/0022575 A1 Jan. 24, 2019

(30) Foreign Application Priority Data
Jan. 14, 2016 (JP) .............................. JP2016-005486

(51) Int. Cl.
*B01D 53/14* (2006.01)
*B01D 53/50* (2006.01)
(Continued)

(52) U.S. Cl.
CPC ......... *B01D 53/1493* (2013.01); *B01D 53/14* (2013.01); *B01D 53/1462* (2013.01);
(Continued)

(58) Field of Classification Search
CPC .............. B01D 53/1493; B01D 53/14; B01D 53/1462; B01D 53/50; B01D 53/62; B01D 53/78; B01D 53/96; C01B 32/50
(Continued)

(56) References Cited

U.S. PATENT DOCUMENTS 8,486,357 B1 * 7/2013 Ito .................... B01D 53/1475
423/228
2009/0068078 A1 3/2009 Grobys et al.
(Continued)

FOREIGN PATENT DOCUMENTS

EP 2335802 A2 6/2011
EP 2537574 A1 12/2012
(Continued)

OTHER PUBLICATIONS

JP 2005-087828 A English Translation (Year: 2005).*
(Continued)

*Primary Examiner* — Anita Nassiri-Motlagh
(74) *Attorney, Agent, or Firm* — Osha Bergman Watanabe & Burton LLP

(57) ABSTRACT

A $CO_2$ recovery device includes an advanced desulfurization-cooling column that removes sulfur oxides in an exhaust gas and reduces a temperature of the exhaust gas; a $CO_2$ absorption column that removes $CO_2$ in the exhaust gas by bringing the $CO_2$ into contact with a $CO_2$ absorption liquid; and a regeneration column that recovers the $CO_2$ by causing the $CO_2$ absorption liquid to release the $CO_2$ while regenerating the $CO_2$ absorption liquid, and feeds the regenerated $CO_2$ absorption liquid to the $CO_2$ absorption column, where the advanced desulfurization-cooling column includes a circulating line that supplies and circulates a desulfurization-cooling circulation liquid used in order to conduct desulfurization and cooling from a lower part to an
(Continued)

upper part of the advanced desulfurization-cooling column, a deep $SO_x$ recovery packed bed, and a first cooler that cools the circulation liquid.

8 Claims, 11 Drawing Sheets

(51) Int. Cl.
 *B01D 53/62* (2006.01)
 *B01D 53/78* (2006.01)
 *C01B 32/50* (2017.01)
 *B01D 53/96* (2006.01)

(52) U.S. Cl.
 CPC ............ *B01D 53/50* (2013.01); *B01D 53/62* (2013.01); *B01D 53/78* (2013.01); *B01D 53/96* (2013.01); *C01B 32/50* (2017.08); *Y02C 20/40* (2020.08); *Y02P 20/151* (2015.11)

(58) Field of Classification Search
 USPC ........................................................ 423/220
 See application file for complete search history.

(56) References Cited

U.S. PATENT DOCUMENTS

| | | |
|---|---|---|
| 2011/0120309 A1 | 5/2011 | Baburao et al. |
| 2013/0255919 A1 | 10/2013 | Wang et al. |

FOREIGN PATENT DOCUMENTS

| | | |
|---|---|---|
| EP | 2786793 A1 | 10/2014 |
| EP | 2862620 A1 | 4/2015 |
| EP | 2910293 A1 | 8/2015 |
| EP | 2910294 A1 | 8/2015 |
| JP | 2005-87828 A | 4/2005 |
| JP | 4216152 B2 | 1/2009 |
| JP | 2009-530073 A | 8/2009 |
| JP | 2013-512088 A | 4/2013 |
| JP | 2015051382 A | 3/2015 |
| JP | 2015223555 A | 12/2015 |
| WO | 2013/144864 A1 | 10/2013 |
| WO | 2013/144889 A1 | 10/2013 |

OTHER PUBLICATIONS

International Search Report for corresponding International Application No. PCT/JP2016/086881, dated Jan. 24, 2017 (2 pages).
International Preliminary Report on Patentability for corresponding International Application No. PCT/JP2016/086881, dated Jul. 17, 2018 (7 pages).
Extended European Search Report issued in corresponding European Application No. 16885081.6, dated Sep. 9, 2019 (11 pages).

* cited by examiner

$CO_2$ RECOVERY DEVICE AND RECOVERY METHOD

Application PCT/JP2016/086881 claims priority from Application 2016-005486 filed on Jan. 14, 2016 in Japan. The entire contents of these applications are incorporated herein by reference in their entirety.

TECHNICAL FIELD

The present invention relates to a $CO_2$ recovery device and to a $CO_2$ recovery method.

BACKGROUND ART

Various methods of removing and recovering acidic gases such as carbon dioxide ($CO_2$) and sulfur oxides contained in fossil fuel combustion exhaust gases and the like have heretofore been proposed. Among them, there is a method of recovering sulfur oxides and $CO_2$ by subjecting an exhaust gas after undergoing a desulfurization treatment further to an advanced desulfurization treatment so as to remove the sulfur oxides from the exhaust gas, then cooling the exhaust gas, and then removing $CO_2$ from the exhaust gas by bringing the exhaust gas into contact with a $CO_2$ absorption liquid such as an alkanolamine aqueous solution.

Sulfur oxides and a circulation liquid that is used in the advanced desulfurization treatment remain in the exhaust gas subjected to the advanced desulfurization treatment, and are accumulated in the $CO_2$ absorption liquid on the downstream for absorbing $CO_2$. Moreover, the exhaust gas needs to be cooled in the light of $CO_2$ absorption performance of the $CO_2$ absorption liquid. As a device to meet this need, there is known a device configured to conduct the advanced desulfurization treatment and the cooling treatment on the exhaust gas in a one-step method (Patent Document 1, for example). On the other hand, there is also known a device configured to conduct the advanced desulfurization treatment and the cooling treatment separately in two-step methods (Patent Documents 1, 2, and 3, for example).

REFERENCE DOCUMENT LIST

Patent Documents

Patent Document 1: Japanese Patent No. 4216152
Patent Document 2: International Publication No. WO2013/144864
Patent Document 3: International Publication No. WO2013/144889

SUMMARY OF THE INVENTION

Problems to be Solved by the Invention

Regarding the above-mentioned devices and methods, when the advanced desulfurization treatment and the cooling treatment on the exhaust gas are conducted in the one-step method, there is a risk of entrainment of the circulation liquid for the advanced desulfurization treatment into the $CO_2$ absorption liquid in an absorption column. In addition, there is a problem of an increase in size of the device when the advanced desulfurization treatment and the cooling treatment on the exhaust gas are conducted separately in the two-step methods.

In view of the aforementioned circumstances, it is an object of the present invention to provide a $CO_2$ recovery device and method which are capable of simplifying a structure of a device while reducing an amount of entrainment of a circulation liquid for a desulfurization cooling treatment into a $CO_2$ absorption liquid.

Means for Solving the Problem

An aspect of the present invention provides a $CO_2$ recovery device. The $CO_2$ recovery device according to the present invention includes: an advanced desulfurization-cooling column configured to remove sulfur dioxide in an exhaust gas and to reduce a temperature of the exhaust gas; a $CO_2$ absorption column configured to remove $CO_2$ in the exhaust gas by bringing the $CO_2$ into contact with a $CO_2$ absorption liquid; and a regeneration column configured to recover the $CO_2$ by causing the $CO_2$ absorption liquid to release the $CO_2$ while regenerating the $CO_2$ absorption liquid, and to feed the regenerated $CO_2$ absorption liquid to the $CO_2$ absorption column. The advanced desulfurization-cooling column includes: a circulating line configured to supply and circulate a desulfurization-cooling circulation liquid for conducting the desulfurization and the cooling from a lower part to an upper part of the advanced desulfurization-cooling column; a deep $SO_x$ recovery packed beddeep $SO_x$ recovery packed bed located above a connection position between the circulating line and an upper part of the cooling column; and a first cooler configured to cool the circulation liquid. The advanced desulfurization-cooling column is configured to directly mix a liquid flowing down from the deep $SO_x$ recovery packed bed with the circulation liquid from the circulating line.

The advanced desulfurization-cooling column preferably includes a first demister located above the deep $SO_x$ recovery packed bed.

The $CO_2$ recovery device can adopt a mode of providing the advanced desulfurization-cooling column with a dilution water supply line located above the deep $SO_x$ recovery packed bed and configured to supply water from outside.

The $CO_2$ recovery device can adopt a mode of further providing the advanced desulfurization-cooling column with a branched circulating line coupled to a portion of the circulating line downstream of the first cooler and configured to supply part of the circulation liquid to a section above the deep $SO_x$ recovery packed bed and below the first demister, and providing the branched circulating line with a second cooler configured to cool the part of the circulation liquid.

The $CO_2$ recovery device can adopt a mode of providing the advanced desulfurization-cooling column with a second demister located between a circulation liquid supply position at the upper part of the circulating line and the deep $SO_x$ recovery packed bed.

Preferably, the circulating line further includes a alkaline compound supply line coupled to a portion downstream of a junction with any of the first cooler and the branched circulating line. More preferably, the circulating line further includes an excess liquid discharge line coupled to a portion upstream of the first cooler.

Another aspect of the present invention provides a $CO_2$ recovery method. The $CO_2$ recovery method according to the present invention is a $CO_2$ recovery method applying the above-mentioned $CO_2$ recovery device, and includes: an advanced desulfurization-cooling step of removing the sulfur dioxide in the exhaust gas and reducing the temperature of the exhaust gas; a $CO_2$ absorbing step of removing the $CO_2$ in the exhaust gas by bringing the $CO_2$ into contact with the $CO_2$ absorption liquid; and the regeneration column configured to recover the $CO_2$ by causing the $CO_2$ absorption liquid to release the $CO_2$ while regenerating the $CO_2$ absorption liquid, and to feed the regenerated $CO_2$ absorption liquid to the $CO_2$ absorption column to reuse the regenerated $CO_2$ absorption liquid. The advanced desulfurization-cooling step further includes: a circulating step of supplying and circulating the desulfurization-cooling circulation liquid used in order to conduct the desulfurization and the cooling from the lower part to the upper part of the advanced desulfurization-cooling column; and a mixing step of directly mixing the liquid flowing down from the deep $SO_x$ recovery packed bed, which is located above the connection position between the circulating line and the upper part of the cooling column, with the circulation liquid from the circulating line.

Effects of the Invention

According to the present invention, there are provided a $CO_2$ recovery device and method, which are capable of simplifying a structure of a device while reducing an amount of entrainment of a circulation liquid for a desulfurization cooling treatment into a $CO_2$ absorption liquid.

MODES FOR CARRYING OUT THE INVENTION

Embodiments of $CO_2$ recovery device and recovery method according to the present invention will be described below in detail with reference to the accompanying drawings. The present invention is not limited to the embodiments described below. The accompanying drawings are drawings for explaining outlines of the embodiments and part of instruments annexed thereto are omitted therein.

First Embodiment

Figure 1:
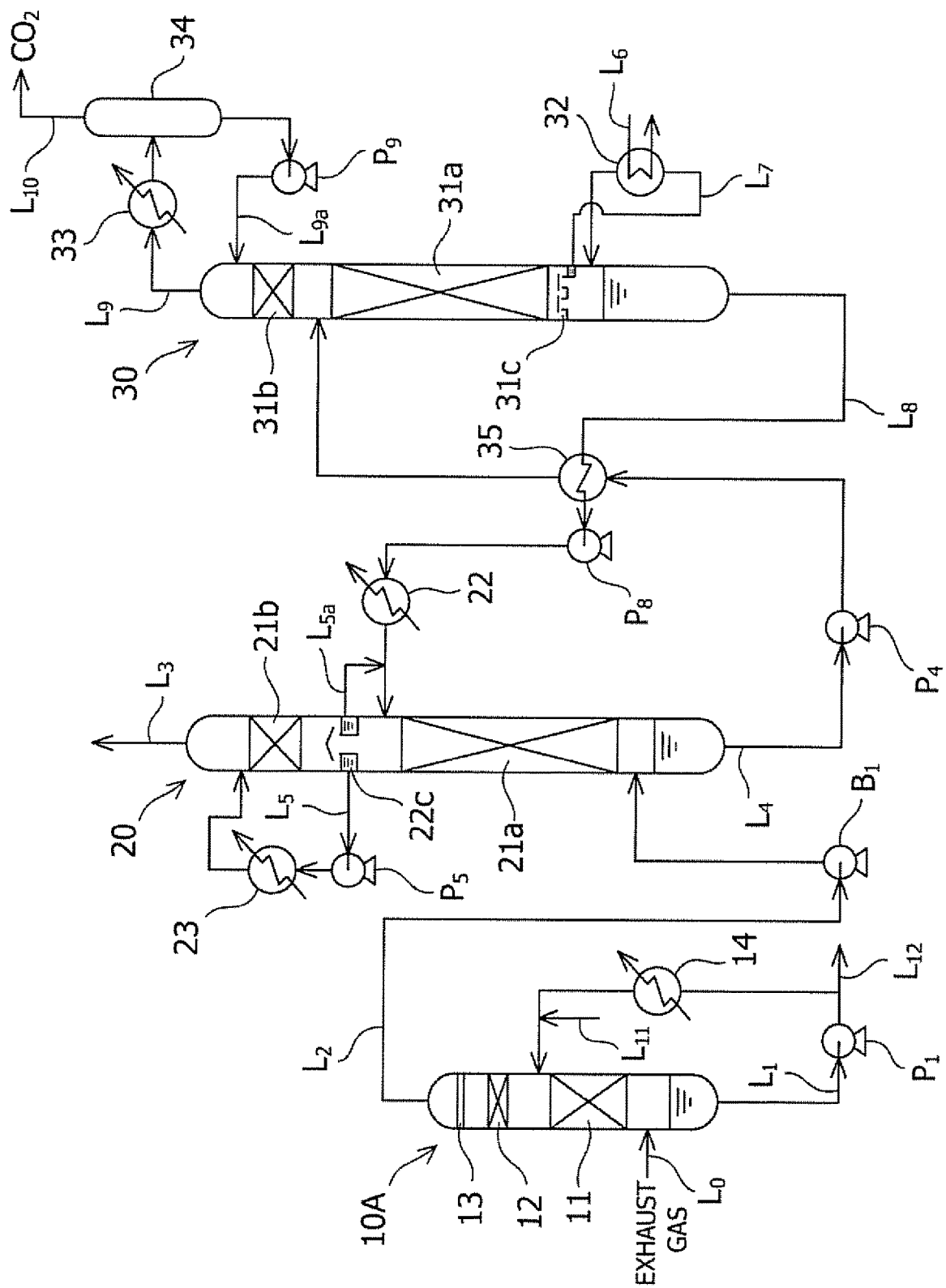
FIG. 1 is a schematic diagram showing a configuration of a $CO_2$ recovery device regarding a first embodiment of the $CO_2$ recovery device and recovery method according to the present invention.
Figure 2:
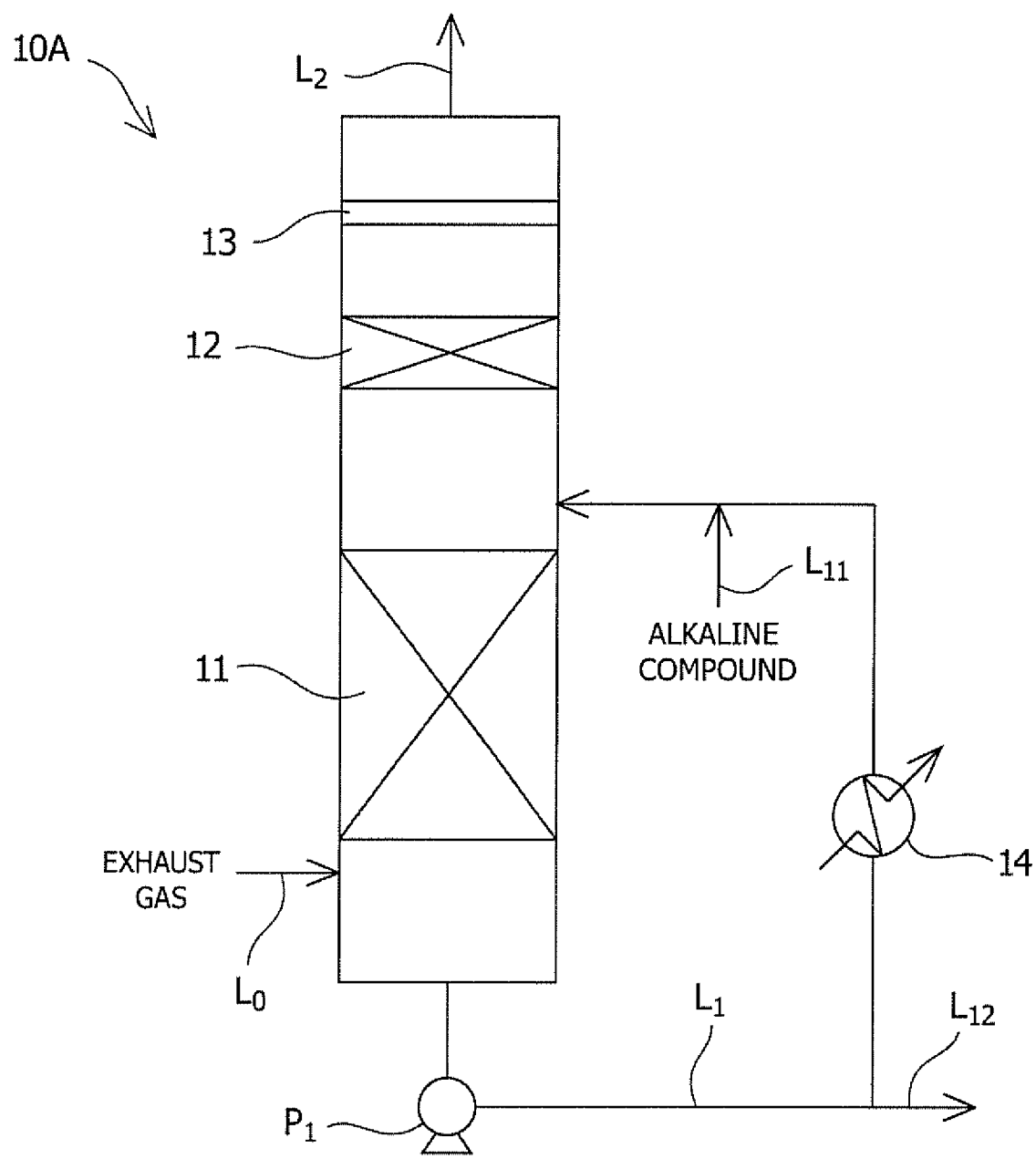
FIG. 2 is a schematic diagram showing a configuration of an advanced desulfurization-cooling column regarding the first embodiment of the $CO_2$ recovery device and recovery method according to the present invention.

A first embodiment of a $CO_2$ recovery device according to the present invention will be described by using FIG. 1 and FIG. 2. As shown in FIG. 1, the $CO_2$ recovery device includes an advanced desulfurization-cooling column 10A for conducting advanced desulfurization and cooling on an exhaust gas at the same time, a $CO_2$ absorption column 20 for absorbing and removing $CO_2$ in the exhaust gas by using a $CO_2$ absorption liquid, and a regeneration column 30 which recovers $CO_2$ and regenerates the $CO_2$ absorption liquid. As for the exhaust gas, it is possible to use gases and the like that contain carbon dioxide ($CO_2$) and sulfur dioxide ($SO_2$) including, natural gas, a process gas produced in a chemical plant for ammonia production and the like, a synthetic gas such as gasified coal gas, a combustion exhaust gas of a fossil fuel, and the like.

The advanced desulfurization-cooling column 10A includes a line $L_0$ located at a lower part of the column and configured to supply the exhaust gas into the column, and also includes at least a line $L_2$ located at a top part of the column and configured to discharge the exhaust gas from the column and to supply the exhaust gas to the $CO_2$ absorption column 20. In addition, the line $L_2$ is provided with a blower $B_1$ configured to feed the exhaust gas to the $CO_2$ absorption column 20.

Subsequently, the advanced desulfurization-cooling column 10A will be described in detail using FIG. 2. Note that this specification and the claims employ the terms "upstream" and "downstream" in conformity with a direction of flow of either the exhaust gas or a circulation liquid. The advanced desulfurization-cooling column 10A includes an advanced desulfurization-cooling packed bed 11, a deep $SO_x$ recovery packed bed 12, and a first demister 13. At a column bottom part of the advanced desulfurization-cooling packed bed column 10A, there is provided a circulating line $L_1$ configured to supply and circulate a circulation liquid (hereinafter also referred to as a desulfurization-cooling circulation liquid), which is accumulated at the column bottom part, from a lower part to an upper part of the advanced desulfurization-cooling column 10A, and to conduct a desulfurization treatment and a cooling treatment in a one-step method.

The advanced desulfurization-cooling packed bed 11 is disposed below the deep $SO_x$ recovery packed bed 12 and below a connection position between the circulating line $L_1$ and the upper part of the advanced desulfurization-cooling column 10A. The advanced desulfurization-cooling packed bed 11 is configured to directly mix the exhaust gas containing the sulfur dioxide with the desulfurization-cooling circulation liquid flowing down from above and containing a alkaline compound. The advanced desulfurization-cooling packed bed 11 removes the sulfur dioxide in the exhaust gas by causing the desulfurization-cooling circulation liquid to absorb the sulfur dioxide in the exhaust gas. In this way, the concentration of the sulfur dioxide in the exhaust gas is reduced downstream of the advanced desulfurization-cooling packed bed 11.

The deep $SO_x$ recovery packed bed 12 is disposed above the advanced desulfurization-cooling packed bed 11 and above the connection position between the circulating line $L_1$ and the upper part of the advanced desulfurization-cooling column 10A. The deep $SO_x$ recovery packed bed 12 is configured to collect mist of the desulfurization-cooling circulation liquid spattered from the lower part in the column and to let the collected mist flow down to the advanced desulfurization-cooling packed bed 11. The liquid flowing down from the deep $SO_x$ recovery packed bed 12 is entrained with the exhaust gas at the lower part and recovered as the desulfurization-cooling circulation liquid. A packing for collecting the sulfur dioxide associated with the exhaust gas is disposed inside the deep $SO_x$ recovery packed bed 12. Examples of the packing include: a structured packing in a plate shape such as a corrugated plate and a flat plate, and a random packing in a ring shape, a saddle shape, and the like. Thus, the concentrations of the sulfur dioxide and of a sulfate originated from the sulfur dioxide and the alkaline compound in the exhaust gas are reduced on the downstream of the deep $SO_x$ recovery packed bed 12.

The first demister 13 is located above the deep $SO_x$ recovery packed bed 12 and configured to remove and recover the mist of the desulfurization-cooling circulation liquid entrained with the exhaust gas, thus accumulating the mist at the column bottom part of the advanced desulfurization-cooling column 10A. Accordingly, the concentrations of the sulfur dioxide and of the sulfate in the exhaust gas are reduced downstream of the first demister 13.

One end of the circulating line $L_1$ is coupled to the column bottom part (a lower connection position) at the lower part of the advanced desulfurization-cooling column 10A, and the other end thereof is coupled to the above-mentioned connection position (an upper connection position) between the advanced desulfurization-cooling packed bed 11 at the upper part of the advanced desulfurization-cooling column 10A and the deep $SO_x$ recovery packed bed 12. The upper connection position is preferably a position which is closer to the advanced desulfurization-cooling packed bed 11 than the deep $SO_x$ recovery packed bed 12 is. At this position, a distance to an upper end of the packing in the advanced desulfurization-cooling packed bed 11 is short so that an amount of entrainment of the circulation liquid with the exhaust gas can be reduced. In the meantime, a cooler 14 configured to cool the desulfurization-cooling circulation liquid is provided on the circulating line $L_1$. The circulating line $L_1$ is coupled to a alkaline compound supply line $L_{11}$ downstream of the cooler 14 and is coupled to a circulation liquid discharge line $L_{12}$ upstream of the cooler 14.

The cooler 14 is a heat exchanger which cools the exhaust gas introduced from the line $L_0$ into the advanced desulfurization-cooling column 10A by cooling the desulfurization-cooling circulation liquid circulated in the circulating line $L_1$, thereby controlling the exhaust gas within a predetermined temperature range. Thus, it is possible to prevent degradation in $CO_2$ absorption efficiency of the $CO_2$ absorption liquid in the $CO_2$ absorption column 20.

The alkaline compound supply line $L_{11}$ is connected to a not-illustrated supply tank for accumulating the alkaline compound and is configured to supply the alkaline compound in this supply tank to the desulfurization-cooling circulation liquid in the circulating line $L_1$. Examples of the alkaline compound include a sodium compound, a calcium compound, and a mixture thereof. It is preferable that the sodium compound be at least one selected from the group consisting of sodium hydroxide (NaOH), sodium carbonate ($Na_2CO_3$), and sodium bicarbonate ($NaHCO_3$). In addition, it is preferable that the calcium compound be at least one selected from the group consisting of calcium hydroxide ($Ca(OH)_2$) and calcium carbonate ($CaCO_3$).

The circulation liquid discharge line $L_{12}$ is configured to discharge part of the desulfurization-cooling circulation liquid circulated in the circulating line $L_1$ so as to remove moisture through a not-illustrated on-off valve, which becomes excess as a consequence of condensation by the first cooler 14. The on-off valve may be a manual valve or an automatic on-off valve, or may be a manual or automatic flow control valve. Thus, it is possible to maintain a constant liquid level of the circulation liquid to be accumulated at the column bottom part of the advanced desulfurization-cooling column 10A. In addition, in order to set the concentration of the sulfur dioxide in the exhaust gas to be introduced from the line $L_2$ into the $CO_2$ absorption column 20 equal to or less than 5 ppm, for example, the alkaline compound in an amount equivalent to an amount of absorption of the sulfur dioxide by the desulfurizing absorption liquid can be supplied from the alkaline compound supply line $L_{11}$ so as to maintain the hydrogen ion exponent (pH) of the circulation liquid.

According to this embodiment, it is possible to simplify equipment and to reduce manufacturing costs by reducing the number of components required for an advanced desulfurization-cooling treatment by using the advanced desulfurization-cooling column 10A, and also to prevent the $CO_2$ absorption liquid in the $CO_2$ absorption column 20 of the $CO_2$ recovery device from being mixed with the sulfur dioxide, the alkaline compound, and the sulfate originated from the sulfur dioxide and the alkaline compound. According to this embodiment, in light of simplification of the equipment and the manufacturing costs, for example, the number of processes required for the advanced desulfurization-cooling treatment is just one, whereas the number of times to circulate the advanced desulfurization-cooling circulation liquid required for the treatment is just one, and the number of coolers required for the cooling is just one. In the meantime, regarding the entrainment of the sulfate into the $CO_2$ absorption liquid, when the sulfur dioxide ($SO_2$) is absorbed in the advanced desulfurization-cooling treatment using the alkaline compound, the sulfate originated from the alkaline compound and the sulfur dioxide is contained in the desulfurization-cooling circulation liquid. Being a stronger acid than $CO_2$, this sulfate is accumulated in the $CO_2$ absorption liquid to be described later and wastes the amine compound in the absorbent. As a consequence, performance of the $CO_2$ absorption liquid is degraded. According to this embodiment, when sodium hydroxide is used as the alkaline compound, for example, it is possible to reduce a ratio of an amount of entrainment of sodium sulfate ($Na_2SO_4$) being the sulfate into the $CO_2$ absorption liquid by about 60% as compared to the case of simply conducting the advanced desulfurization-cooling treatment in one step.

Next, the $CO_2$ absorption column 20 and the regeneration column 30 will be described in detail by using FIG. 1. In the $CO_2$ absorption column 20, a lower part of the column is coupled to the line $L_2$ configured to supply the $CO_2$-containing exhaust gas into the $CO_2$ absorption column 20, while a top part of the column is provided with a line $L_3$ configured to discharge the exhaust gas deprived of $CO_2$ from the $CO_2$ absorption column 20. The $CO_2$ absorption column 20 includes a $CO_2$ absorption unit 21a in which the exhaust gas and the $CO_2$ absorption liquid come into gas-liquid contact with each other, a water washing unit 21b in which the exhaust gas after the contact with the $CO_2$ absorption liquid and a washing liquid come into gas-liquid contact with each other, and a washing liquid collector 21c located between the water washing unit 21b and the $CO_2$ absorption unit 21a, all of the units being located between connection positions to the lines $L_2$ and $L_3$. The washing liquid collector 21c is configured to allow passage of a gas from below upward and to block passage of a liquid from above downward. The washing liquid collector 21c is provided with a line $L_5$ configured to supply a liquid accumulated at the washing liquid collector 21c from above the water washing unit 21b into the $CO_2$ absorption column 20. The line $L_5$ includes a pump $P_5$ configured to feed the liquid, and a cooler 23 configured to cool the liquid.

In addition, at a column bottom part of the $CO_2$ absorption column 20, a line $L_4$ is provided in order to send the $CO_2$ absorption liquid having absorbed $CO_2$ (a rich absorption liquid) to the regeneration column 30. The line $L_4$ includes a pump $P_4$ configured to feed the $CO_2$ absorption liquid and a heat exchanger 35 configured to perform heat exchange with a lean absorption liquid, to be described later, which are arranged in sequence from the $CO_2$ absorption column 20 side.

The regeneration column 30 includes a lower packed bed 31a located below a connection position to the line $L_4$ to which the rich absorption liquid is supplied and configured to release $CO_2$ from the rich absorption liquid, an upper packed bed 31b configured to bring the released $CO_2$ gas in contact with reflux water, to be described later, and an absorption liquid collector 31c located below the lower packed bed 31a. The absorption liquid collector 31c is configured to allow passage of a gas from below upward and to block passage of a liquid from above downward. The absorption liquid collector 31c is provided with a line $L_7$ configured to supply and circulate the absorption liquid accumulated at the absorption liquid collector 31c from a lower part of the absorption liquid collector 31c into the regeneration column 30. The line $L_7$ is provided with a reboiler 32 configured to heat the absorption liquid so as to enable the absorption liquid to release $CO_2$. The reboiler 32 is provided with a line $L_6$ configured to supply saturated steam for heating to the reboiler 32.

A line $L_9$ configured to discharge the $CO_2$ gas, which is released from the rich absorption liquid, from the regeneration column 30 is provided at a column top part of the regeneration column 30. A cooler 33 configured to cool the $CO_2$ gas down and a gas-liquid separator 34 configured to separate condensed water generated by the cooling from the $CO_2$ gas are provided on the line $L_9$. The gas-liquid separator 34 is provided with a line $L_{9a}$ configured to supply the separated condensed water as the reflux water to a section above the upper packed bed 31b in the regeneration column 30, and a line $L_{10}$ configured to discharge the separated $CO_2$ gas from the system. The line $L_{9a}$ is provided with a pump $P_9$ configured to feed the circulating water.

In addition, a line $L_8$ configured to supply the lean absorption liquid, which is heated and regenerated by the reboiler 32, to a section above the $CO_2$ absorption unit 21a in the $CO_2$ absorption column 20 is provided at a column bottom part of the regeneration column 30. The line $L_8$ is provided with: the heat exchanger 35 configured to perform the heat exchange with the rich absorption liquid flowing on the line $L_4$; a pump $P_8$ configured to feed the lean absorption liquid; a cooler 22 configured to cool the lean absorption liquid; and a line $L_{5a}$ configured to supply part of the liquid accumulated at the washing liquid collector 21c of the $CO_2$ absorption column 20 into the $CO_2$ absorption column 20 together with the lean absorption liquid, which are arranged in sequence from the regeneration column 30 side.

The regeneration column 30 can further include a not-illustrated reclaimer optionally, which is to be located at the column bottom part. As mentioned earlier, although the advanced desulfurization-cooling column 10A can adequately remove the sulfur dioxide in the exhaust gas, the lean absorption liquid at the column bottom part of the regeneration column 30 retains the absorbed sulfur dioxide in the form of a sulfate or a sulfite. The reclaimer is configured to add the alkaline compound to the lean absorption liquid accumulated at the column bottom part, then to separate the sulfate or the sulfite from the lean absorption liquid by heating the lean absorption liquid with steam, and then to circulate the lean absorption liquid back to the column bottom part of the regeneration column 30. The reclaimer is configured to discharge the separated sulfate or sulfite as sludge. As described above, the degradation in $CO_2$ absorption performance of the lean absorption liquid can be prevented by removing the sulfate or the sulfite attributed to the sulfur dioxide from the lean absorption liquid. The mode provided with the reclaimer can reduce the concentration of the sulfur dioxide in the exhaust gas in the advanced desulfurization-cooling column 10A. Accordingly, it is possible to reduce the number of times of reclaiming with the reclaimer and thus to reduce operating costs.

Next, the first embodiment of the $CO_2$ recovery method according to the present invention will be described by explaining a mode of operation of the $CO_2$ recovery device having the above-mentioned configuration. The method will be described mainly with reference to FIG. 1.

First, the exhaust gas that contains $CO_2$ and the sulfur dioxide is supplied from the line $L_0$ to the advanced desulfurization-cooling column 10A, and the advanced desulfurization treatment and the cooling treatment are conducted at the same time as an advanced desulfurization-cooling step.

In the advanced desulfurization-cooling column 10A, the sulfur dioxide in the exhaust gas is removed by directly mixing the liquid flowing down from the deep $SO_x$ recovery packed bed 12 with the desulfurization-cooling circulation liquid from the circulating line $L_1$ in the advanced desulfurization-cooling packed bed 11. The desulfurization-cooling circulation liquid accumulated at the column bottom part of the advanced desulfurization-cooling column 10A is cooled with the cooler 14 through the circulating line $L_1$ by using a pump $P_1$ and then supplied from a line $L_{11}$ to the advanced desulfurization-cooling column 10A for cyclical use. In other words, the desulfurization-cooling circulation liquid is supplied and circulated from the lower part to the upper part of the advanced desulfurization-cooling column 10A, and the liquid flowing down from the deep $SO_x$ recovery packed bed 12 is directly mixed with the desulfurization-cooling circulation liquid from the circulating line. A temperature (a cooling temperature) of the exhaust gas after the cooling is set preferably in a range of not less than 30° C. and not more than 50° C., or more preferably in a range from not less than 30° C. and below 45° C. The cooling temperature in excess of 50° C. increases the operating costs and the like due to the degradation in $CO_2$ absorption efficiency in the $CO_2$ absorption column 20, for example. In addition, the cooling temperature below 30° C. increases a cost for the cooling. As described above, the sulfur dioxide in the exhaust gas is removed by using the advanced desulfurization-cooling packed bed 11 as well as the first cooler 14 and the temperature of the exhaust gas is reduced. Then, the exhaust gas is introduced from the column top part of the advanced desulfurization-cooling column 10A into the lower part of the $CO_2$ absorption column 20 through the line $L_2$ by using the blower $B_1$.

Subsequently, in the $CO_2$ absorption column 20, the exhaust gas introduced from the line $L_2$ is brought into countercurrent contact at the $CO_2$ absorption unit 21a with the $CO_2$ absorption liquid introduced from the line $L_8$ so as to cause the $CO_2$ absorption liquid to absorb $CO_2$ in the exhaust gas, thereby removing $CO_2$ from the exhaust gas. Thus, it is possible to remove 90% or more of $CO_2$ from the exhaust gas, for example. The $CO_2$ absorption liquid is an aqueous solution of an amine compound. As for the amine compound, it is possible to use alkanolamine such as monoethanolamine ($C_2H_7NO$), diethanolamine ($C_4H_{11}NO_2$), diisopropanolamine ($C_6H_{15}NO_2$), methyldiethanolamine ($C_5H_{13}NO_2$), and triethanolamine ($C_6H_{15}NO_3$).

The exhaust gas deprived of $CO_2$ in the $CO_2$ absorption column 20 entrains moisture and the amine compound vaporized under a high temperature as a consequence of an exothermic reaction associated with the $CO_2$ absorption. For this reason, the exhaust gas is brought into contact with the cleaning liquid in the water washing unit 21b, and the moisture and the amine compound in the gas are condensed and recovered in the cleaning liquid. Then, the exhaust gas deprived of $CO_2$ is discharged from the column top part of the $CO_2$ absorption column 20 through the line $L_3$. In addition, since the cleaning liquid containing the moisture and the amine compound is accumulated at the washing liquid collector 21c, part of the cleaning liquid is cooled with the cooler 23 through the line $L_5$ by using the pump $P_5$, and is supplied to a section of the $CO_2$ absorption column 20 above the water washing unit 21b for cyclical use as the cleaning liquid. In addition, another part of the cleaning liquid is deemed as an excess portion and added to the line $L_8$ configured to supply the lean absorption liquid through the line $L_{5a}$ in order to reuse the liquid as the absorption liquid. The rich absorption liquid having absorbed $CO_2$ is accumulated at the column bottom part of the $CO_2$ absorption column 20, then heated with the heat exchanger 35 through the line $L_4$ by using the pump $P_4$ and then supplied to the regeneration column 30.

The rich absorption liquid supplied to the regeneration column 30 flows down and accumulates at the absorption liquid collector 31c while releasing $CO_2$ by an endothermic reaction at the lower packed bed 31a. Then, the rich absorption liquid is supplied to the reboiler 32 through the line $L_7$ and heated by the heat exchange with the high-temperature saturated steam from the line $L_6$, whereby $CO_2$ in the rich absorption liquid is released. The saturated steam introduced into the reboiler 32 is condensed into saturated water as a consequence of the heat exchange with the absorption liquid, and is discharged from the reboiler 32. The lean absorption liquid after releasing $CO_2$ is accumulated at the column bottom part of the regeneration column 30.

The $CO_2$ gas separated from the absorption liquid in the regeneration column 30 is brought into gas-liquid contact at the upper packed bed 31b of the regeneration column 30 with the reflux water supplied from the line $L_{9a}$ to remove the entrained $CO_2$ absorption liquid, and is then discharged from the column top part of the regeneration column 30 through the line $L_9$. The discharged $CO_2$ gas is cooled with the cooler 33 to condense the moisture, thus being separated into the $CO_2$ gas and the condensed water with the gas-liquid separator 34. The separated $CO_2$ gas is discharged through the line $L_{10}$ and recovered as the high-purity $CO_2$ gas, while the condensed water is supplied to the regeneration column 30 through the line $L_{9a}$ by using the pump $P_9$, and is reused as the circulating water. In addition, the lean absorption liquid accumulated at the column bottom part of the regeneration column 30 is introduced into the heat exchanger 35 through the line $L_8$ by using the pump $P_8$, and is cooled by being brought into heat exchange with the rich absorption liquid. The lean absorption liquid is further cooled with the cooler 22 and then supplied to the $CO_2$ absorption column 20 for the cyclical use as the $CO_2$ absorption liquid for absorbing $CO_2$. The temperature of the $CO_2$ absorption liquid to be supplied to the $CO_2$ absorption column 20 can be adjusted by using the heat exchanger 35 and the cooler 22.

Second Embodiment

Figure 3:
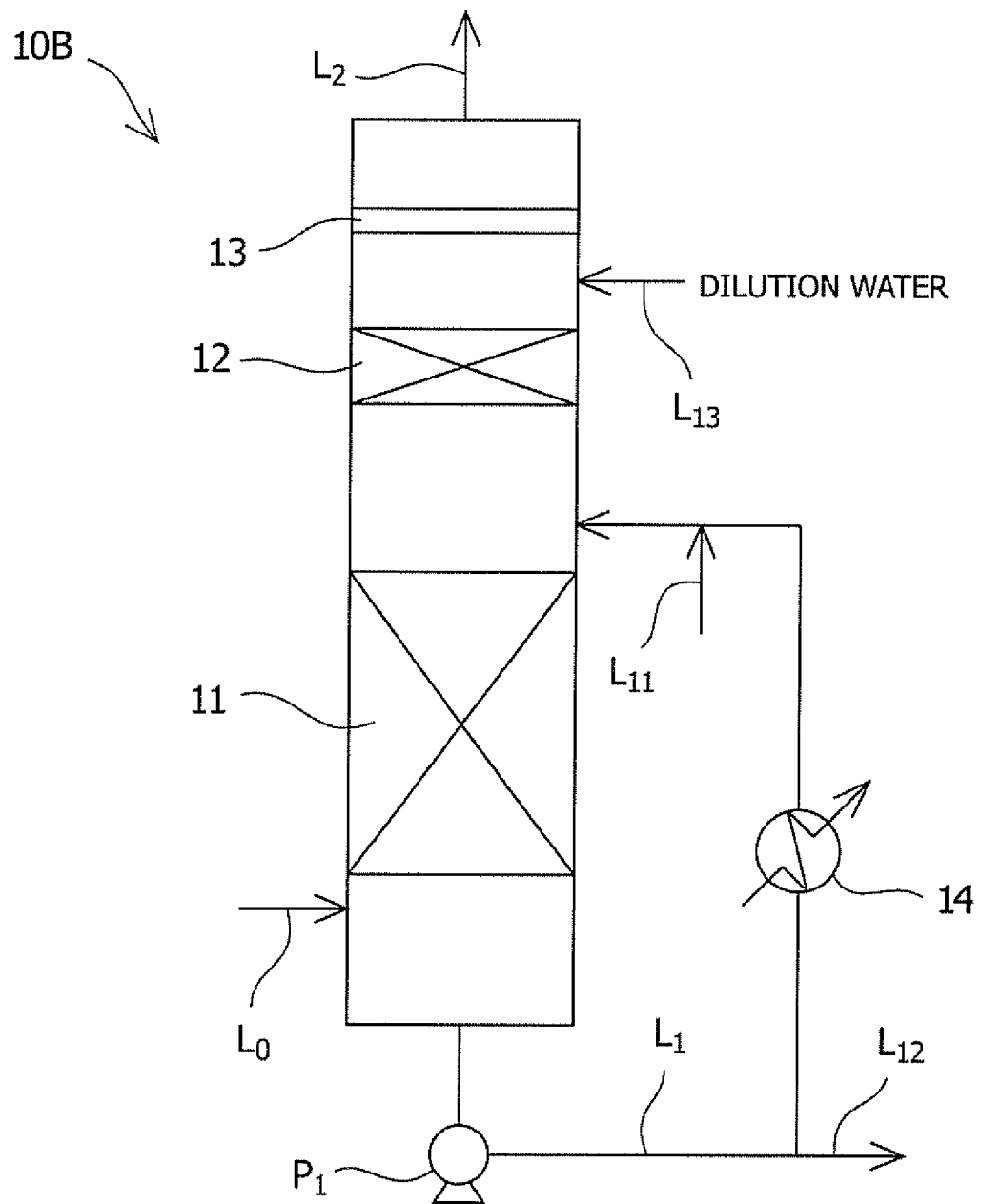
FIG. 3 is a schematic diagram showing a configuration of an advanced desulfurization-cooling column regarding a second embodiment of the $CO_2$ recovery device and recovery method according to the present invention.

Next, a second embodiment of the $CO_2$ recovery device and recovery method according to the present invention will be described with reference to FIG. 3. The $CO_2$ recovery device shown in FIG. 3 is different from the first embodiment mainly in that an advanced desulfurization-cooling column 10B is provided instead of the advanced desulfurization-cooling column 10A. Herein, descriptions of components which are the same as those in FIG. 1 and FIG. 2 will be omitted.

The advanced desulfurization-cooling column 10B is coupled to a dilution water supply line $L_{13}$ at a section above the deep $SO_x$ recovery packed bed 12 and below the first demister 13. The dilution water supply line $L_{13}$ supplies dilution water from outside of the system, that is, the dilution water from outside of the advanced desulfurization-cooling column 10B to the section inside the column between the deep $SO_x$ recovery packed bed 12 and the first demister 13. In this way, the concentration of the sulfate relative to a certain amount of mist in the exhaust gas is reduced so as to reduce the concentration of the sulfate in the desulfurization-cooling circulation liquid entrained with the exhaust gas. Moreover, according to the above-described configuration, the liquid flowing down from the deep $SO_x$ recovery packed bed 12 turns out to be a mixed liquid of the dilution water from the outside of the advanced desulfurization-cooling column to be supplied to the deep $SO_x$ recovery packed bed 12 and the circulation liquid entrained with the exhaust gas and recovered at a section below the deep $SO_x$ recovery packed bed 12. The temperature of the dilution water can be set in a range from not less than 30° C. and not more than 50° C., for example, in order to maintain the temperature of the exhaust gas cooled with the first cooler 14.

According to this embodiment, it is possible to exert an effect similar to that of the first embodiment, and to further reduce the concentration of the sulfate in the desulfurization-cooling circulation liquid entrained with the exhaust gas, thereby further reducing the concentration of the sulfate which is entrained with the exhaust gas and incorporated into the $CO_2$ absorption liquid in the $CO_2$ absorption column 20. According to this embodiment, when sodium hydroxide is used as the alkaline compound, for example, the ratio of the amount of entrainment of sodium sulfate as the sulfate into the $CO_2$ absorption liquid can be reduced by about 90% as compared to the case of simply conducting the advanced desulfurization-cooling in one step.

Third Embodiment

Figure 4:
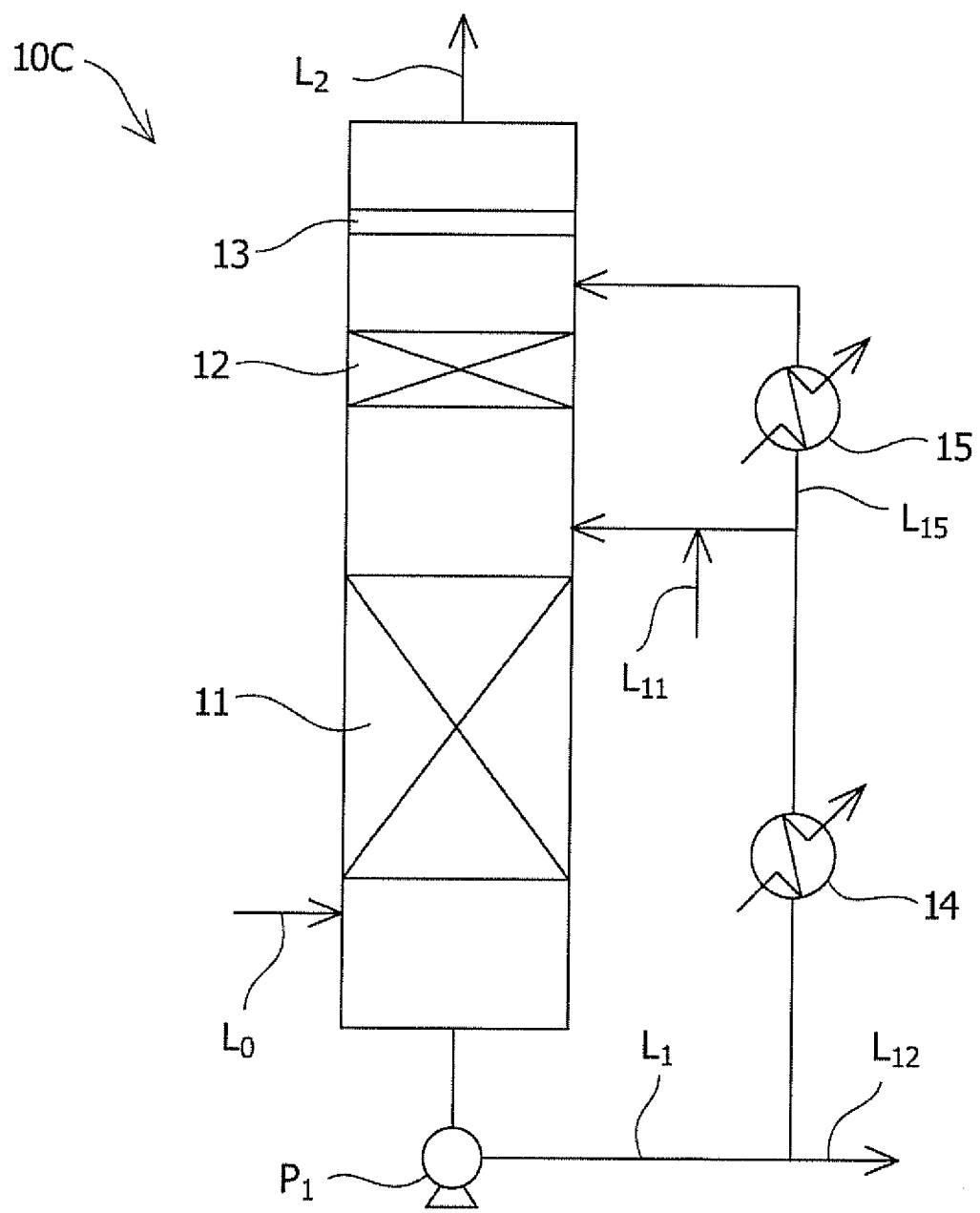
FIG. 4 is a schematic diagram showing a configuration of an advanced desulfurization-cooling column regarding a third embodiment of the $CO_2$ recovery device and recovery method according to the present invention.

Next, a third embodiment of the $CO_2$ recovery device and recovery method according to the present invention will be described with reference to FIG. 4. The $CO_2$ recovery device shown in FIG. 4 is different from the first embodiment mainly in that an advanced desulfurization-cooling column 10C is provided instead of the advanced desulfurization-cooling column 10A. Moreover, the advanced desulfurization-cooling column 10C is different from the advanced desulfurization-cooling column 10A mainly in that a branched circulating line $L_{15}$ is provided therein. Herein, descriptions of components which are the same as those in FIG. 1 and FIG. 2 will be omitted.

The branched circulating line $L_{15}$ is configured to supply part of the desulfurization-cooling circulation liquid in the circulating line $L_1$ to the section above the deep $SO_x$ recovery packed bed 12 and below the first demister 13 by using a not-illustrated on-off valve. The on-off valve may be a manual valve or an automatic on-off valve, or may be a manual or automatic flow control valve. In this way, the branched circulating line $L_{15}$ controls a flow rate of the circulation liquid flowing into the circulating line $L_1$. The flow rate of the circulation liquid in the branched circulating line $L_{15}$ is set smaller than the flow rate of the circulation liquid in the circulating line $L_1$. For example, a flow rate ratio between the flow rate ($m^3/h$) of the circulation liquid in the branched circulating line $L_{15}$ and the flow rate ($m^3/h$) of the circulation liquid in the circulating line $L_1$ can be set in a range from 1:100 to 1:3. By controlling the flow rates of the circulation liquid in the circulating line $L_1$ and the branched circulating line $L_{15}$ as described above, it is possible to reduce a spattering amount of the circulation liquid at a section above the advanced desulfurization-cooling packed bed 11 as well as the deep $SO_x$ recovery packed bed 12 and below the first demister 13. Thus, the entrainment of the sulfate into the $CO_2$ absorption liquid can be reliably prevented.

Moreover, the branched circulating line $L_{15}$ further includes a second cooler 15. The second cooler 15 is a heat exchanger which reduces the temperature of the circulation liquid in the branched circulating line $L_{15}$. The second cooler 15 can reduce the concentration of the sulfate in a certain amount of spreading mist by condensing the moisture in the exhaust gas and thus reducing the concentration of the sulfate in the circulation liquid in the branched circulating line $L_{15}$.

The alkaline compound supply line $L_{11}$ is coupled to a portion of the circulating line $L_1$ downstream of a junction between the circulating line $L_1$ and the branched circulating line $L_{15}$. Thus, it is possible to reduce the amount of mist of the entrained circulation liquid in the exhaust gas on the downstream of the first demister 13, which is attributed to the entrainment of the alkaline compound into the branched circulating line $L_{15}$. Accordingly, the entrainment of the sulfate into the $CO_2$ absorption liquid in the $CO_2$ absorption column 20 can be prevented. In this way, it is possible to prevent the degradation in $CO_2$ absorption performance of the $CO_2$ absorption liquid.

According to this embodiment, it is possible to exert an effect similar to that of the first embodiment, and to further reduce the concentration of the sulfate in the desulfurization-cooling circulation liquid entrained with the exhaust gas, thereby further reducing the concentration of the sulfate which is incorporated into the $CO_2$ absorption liquid in the $CO_2$ absorption column 20. According to this embodiment, when sodium hydroxide is used as the alkaline compound, for example, the ratio of the amount of entrainment of sodium sulfate as the sulfate into the $CO_2$ absorption liquid can be reduced by about 75% as compared to the case of simply conducting the advanced desulfurization-cooling in one step.

Fourth Embodiment

Figure 5:
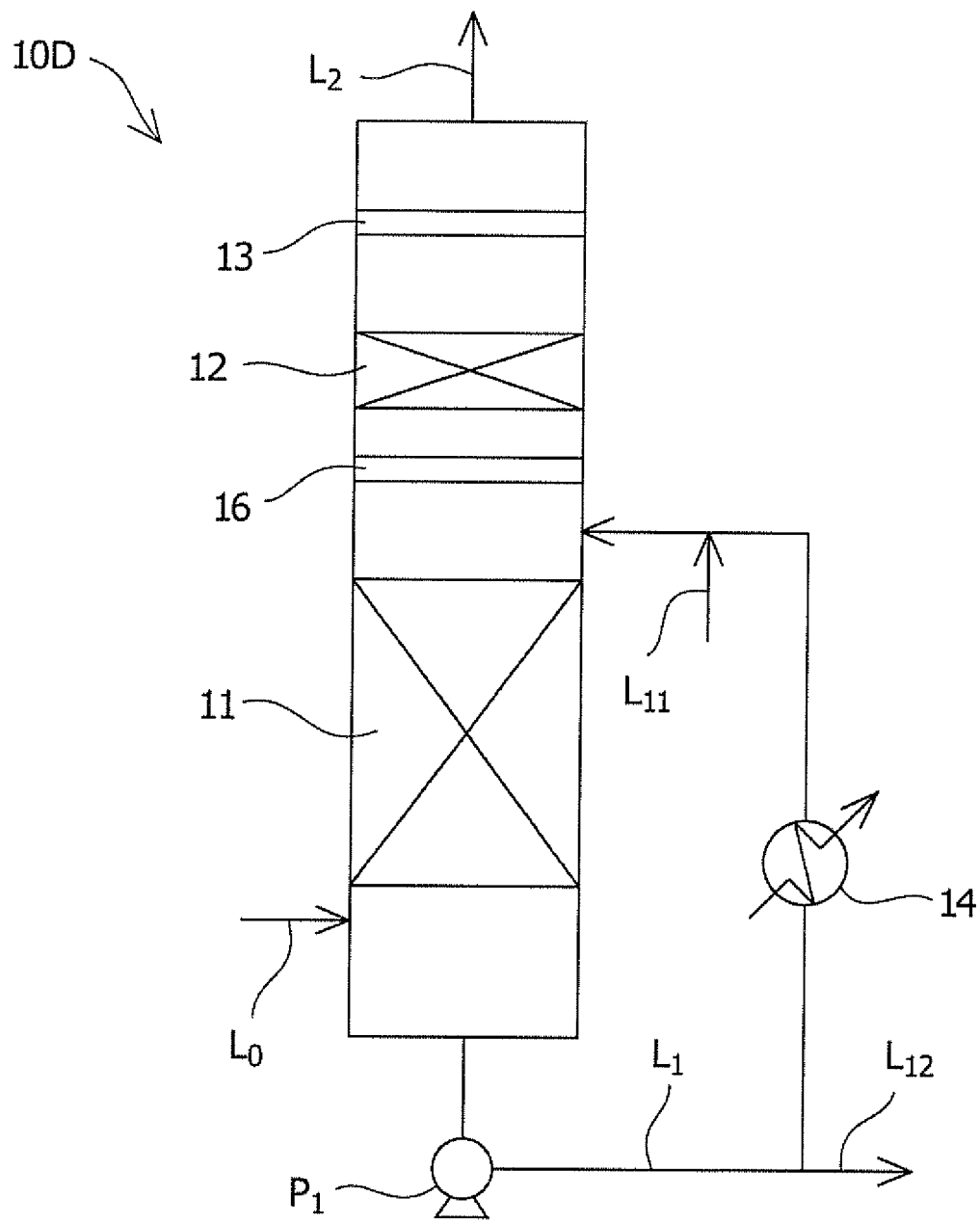
FIG. 5 is a schematic diagram showing a configuration of an advanced desulfurization-cooling column regarding a fourth embodiment of the $CO_2$ recovery device and recovery method according to the present invention.

Next, a fourth embodiment of the $CO_2$ recovery device and recovery method according to the present invention will be described with reference to FIG. 5. As shown in FIG. 5, the $CO_2$ recovery device of this embodiment is different from the $CO_2$ recovery device of the first embodiment mainly in that an advanced desulfurization-cooling column 10D that further includes a second demister 16 is provided therein. Herein, descriptions of components which are the same as those in FIG. 2 are omitted.

As shown in FIG. 5, the second demister 16 is located above the advanced desulfurization-cooling packed bed 11 and below the deep $SO_x$ recovery packed bed 12. To be more precise, the second demister 16 is located above the upper connection position between the advanced desulfurization-cooling column 10D and the circulating line $L_1$. The second demister 16 collects the circulation liquid spattering upward from the advanced desulfurization-cooling packed bed 11, and reduces the concentration of the sulfate in the circulation liquid on the upstream of the deep $SO_x$ recovery packed bed 12. Thus, it is possible to further reduce the concentration of the sulfate in the exhaust gas discharged from the advanced desulfurization-cooling column 10.

According to this embodiment, it is possible to exert an effect similar to that of the first embodiment, and to further reduce the concentration of the sulfate in the $CO_2$ absorption liquid in the $CO_2$ absorption column 20. According to this embodiment, when sodium hydroxide is used as the alkaline compound, for example, the ratio of the amount of entrainment of sodium sulfate as the sulfate into the $CO_2$ absorption liquid can be reduced by about 80% as compared to the case of simply conducting the advanced desulfurization-cooling in one step.

Fifth Embodiment

Figure 6:
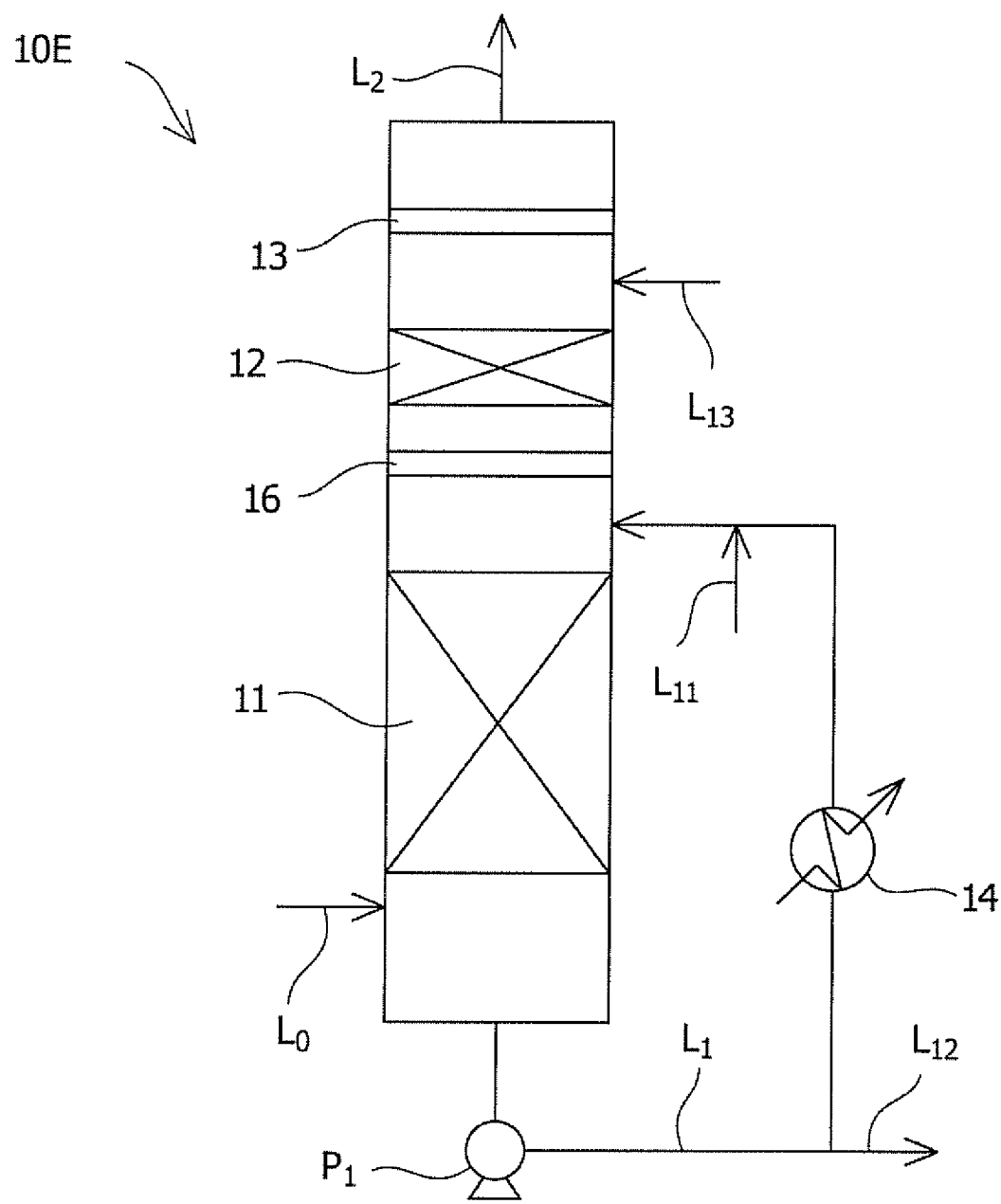
FIG. 6 is a schematic diagram showing a configuration of an advanced desulfurization-cooling column regarding a fifth embodiment of the $CO_2$ recovery device and recovery method according to the present invention.

Next, a fifth embodiment of the $CO_2$ recovery device and recovery method according to the present invention will be described with reference to FIG. 6. As shown in FIG. 6, the $CO_2$ recovery device of this embodiment is different from the $CO_2$ recovery device of the second embodiment mainly in that an advanced desulfurization-cooling column 10E that further includes the second demister 16 is provided therein. Herein, descriptions of components which are the same as those in FIG. 3 are omitted.

As shown in FIG. 6, the second demister 16 is located above the advanced desulfurization-cooling packed bed 11 and below the deep $SO_x$ recovery packed bed 12. To be more precise, the second demister 16 is located above the upper connection position between the advanced desulfurization-cooling column 10E and the circulating line $L_1$. The second demister 16 collects the circulation liquid spattering upward from the advanced desulfurization-cooling packed bed 11, and reduces the concentration of the sulfate in the circulation liquid on the upstream of the deep $SO_x$ recovery packed bed 12. Thus, it is possible to further reduce the concentration of the sulfate in the exhaust gas discharged from the advanced desulfurization-cooling column.

According to this embodiment, it is possible to exert an effect similar to that of the second embodiment, and to further reduce the concentration of the sulfate in the $CO_2$ absorption liquid in the $CO_2$ absorption column 20. According to this embodiment, when sodium hydroxide is used as the alkaline compound, for example, the ratio of the amount of entrainment of sodium sulfate as the sulfate into the $CO_2$ absorption liquid can be reduced by 90% or more as compared to the case of simply conducting the advanced desulfurization-cooling in one step.

Sixth Embodiment

Figure 7:
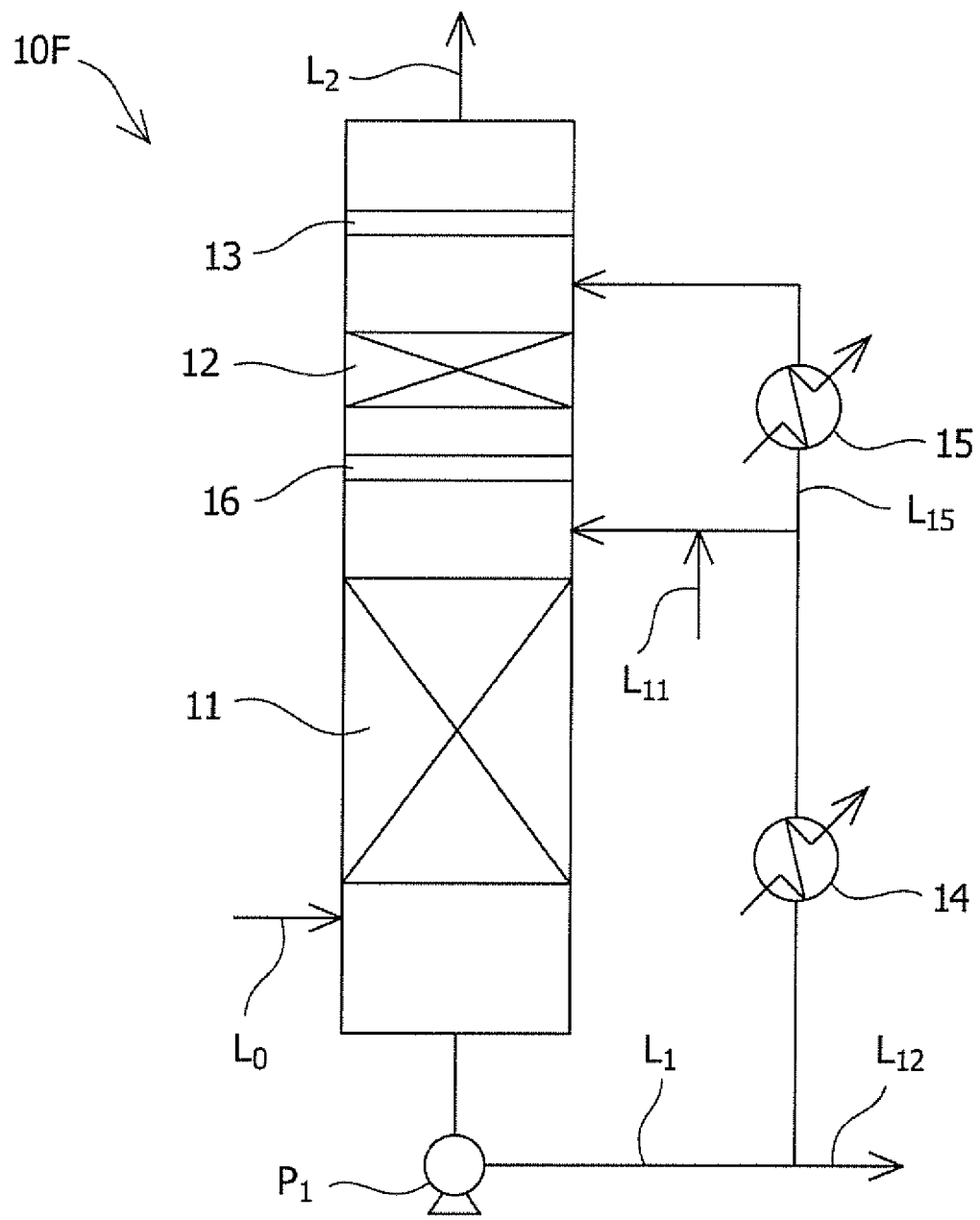
FIG. 7 is a schematic diagram showing a configuration of an advanced desulfurization-cooling column regarding a sixth embodiment of the $CO_2$ recovery device and recovery method according to the present invention.

Next, a sixth embodiment of the $CO_2$ recovery device and recovery method according to the present invention will be described with reference to FIG. 7. As shown in FIG. 7, the $CO_2$ recovery device of this embodiment is different from the $CO_2$ recovery device of the third embodiment mainly in that an advanced desulfurization-cooling column 10F that further includes the second demister 16 is provided therein. Herein, descriptions of components which are the same as those in FIG. 4 will be omitted.

As shown in FIG. 7, the second demister 16 is located above the advanced desulfurization-cooling packed bed 11 and below the deep $SO_x$ recovery packed bed 12. To be more precise, the second demister 16 is located above the upper connection position between the advanced desulfurization-cooling column 10F and the circulating line $L_1$. The second demister 16 collects the circulation liquid spattering upward from the advanced desulfurization-cooling packed bed 11, and reduces the concentration of the sulfate in the circulation liquid on the upstream of the deep $SO_x$ recovery packed bed 12. Thus, it is possible to further reduce the concentration of the sulfate in the exhaust gas discharged from the advanced desulfurization-cooling column.

According to this embodiment, it is possible to exert an effect similar to that of the third embodiment, and to further reduce the concentration of the sulfate in the $CO_2$ absorption liquid in the $CO_2$ absorption column 20. According to this embodiment, when sodium hydroxide is used as the alkaline compound, for example, the ratio of the amount of entrainment of sodium sulfate as the sulfate into the $CO_2$ absorption liquid can be reduced by 80% or more as compared to the case of simply conducting the advanced desulfurization-cooling in one step.

The above-described embodiments showed examples of the configurations of the $CO_2$ recovery device. However, the present invention is not limited only to these configurations. The $CO_2$ recovery device according to the present invention can further include a desulfurization device on the upstream of the advanced desulfurization-cooling column. By performing desulfurization on the upstream of the advanced desulfurization-cooling column with the desulfurization device, it is possible to further reduce the amount of entrainment of the sulfate to be incorporated into the $CO_2$ absorption liquid in the $CO_2$ absorption column 20.

In addition, the third and sixth embodiments showed the configurations and the methods in which only the branched circulating line $L_{15}$ was added. However, the present invention is not limited only to these configurations. For example, it is possible to adopt a configuration in which the dilution water supply line $L_{13}$ is coupled to the branched circulating line $L_{15}$ so as to introduce the dilution water into the circulation liquid in the branched circulating line $L_{15}$. For example, when the dilution water supply line $L_{13}$ is coupled to the downstream of the second cooler 15 on the branched circulating line $L_{15}$, the cooling temperature with the dilution water may be set equivalent to those in the second and fifth embodiments. In the meantime, when the dilution water supply line $L_{13}$ is coupled to the upstream of the second cooler 15 on the branched circulating line $L_{15}$, condensed water originated from excess steam in an adjacent chemical plant can be used as the dilution water. In this way, it is also possible to enhance operating efficiency of the adjacent chemical plant. In this case as well, the cooling temperature with the dilution water may be set equivalent to those in the second and fifth embodiments.

EXAMPLES

The effect of the present invention will be clarified by specifically describing the present invention with reference to Examples. Note that the $CO_2$ recovery device and recovery method according to the present invention are not limited to these Examples.

<Measurement of Amount of Sulfate I>

Figure 8:
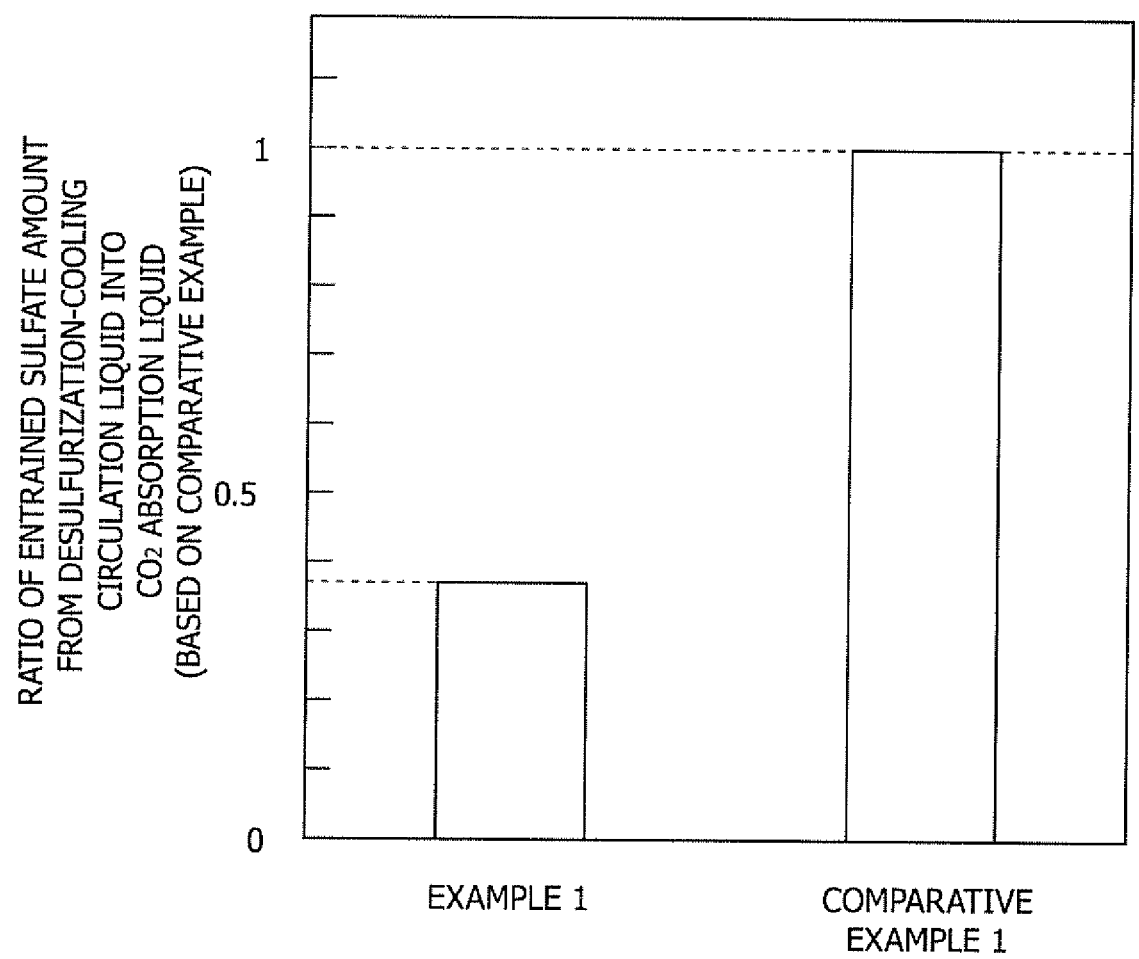
FIG. 8 is a diagram showing a result of Example 1 regarding the $CO_2$ recovery device and recovery method according to the present invention.

The $CO_2$ recovery device of the first embodiment was used in Example 1. The deep $SO_x$ recovery packed bed installed in the advanced desulfurization-cooling column of the $CO_2$ recovery device applied the structured packing as the packing therein. In addition, a $CO_2$ recovery device including an advanced desulfurization-cooling column configured to conduct an advanced desulfurization-cooling treatment in one step and lacking a deep $SO_x$ recovery packed bed between an advanced desulfurization-cooling packed bed and a demister was used as Comparative Example 1. The concentration of sodium sulfate as the sulfate in the $CO_2$ absorption liquid was measured in terms of each of the $CO_2$ absorption columns of Example 1 and Comparative Example 1, and a ratio of an amount of entrainment of sodium sulfate in Example 1 was evaluated while defining the concentration (the amount of entrainment) of the sulfate in the $CO_2$ absorption liquid in Comparative Example 1 as 1. In other words, the ratio of the amount of entrainment of the desulfurization-cooling circulation liquid, which was entrained with the exhaust gas introduced into the absorption column, into the $CO_2$ absorption liquid was evaluated. In Example 1 and Comparative Example 1, the flow rate of the exhaust gas introduced into each advanced desulfurization-cooling column was set to 200 m$^3$/h. In addition, sodium hydroxide was used as the alkaline compound to be introduced into the advanced desulfurization-cooling column, and the concentration of the sulfur dioxide in the exhaust gas introduced into each $CO_2$ absorption column was set equal to or below 5 ppm. In the meantime, the temperature inside each advanced desulfurization-cooling column was cooled down from 55° C. to 35° C. In addition, Example 1 and Comparative Example 1 adopted monoethanolamine as the $CO_2$ absorption liquid to be used in the $CO_2$ absorption column while applying the same amount of circulation of the $CO_2$ absorption liquid while not operating the reclaimer in each regeneration column. A result of the evaluation is shown in FIG. 8.

The result shown in FIG. 8 revealed that, according to the $CO_2$ recovery device and recovery method of Example 1, the ratio of the amount of entrainment of sodium sulfate into the $CO_2$ absorption liquid fell below 0.4 relative to Comparative Example 1 and the amount of entrainment of sodium sulfate could thus be reduced to below ⅖. In other words, it turned out that the $CO_2$ recovery device and recovery method of Example 1 could reduce the concentration of the sulfate in the $CO_2$ absorption liquid by 60% or more in comparison with Comparative Example 1. In this way, it turned out that the $CO_2$ recovery device and recovery method of Example 1 could reduce the amount of entrainment of the circulation liquid for the advanced desulfurization-cooling treatment into the $CO_2$ absorption liquid even when the structure of the device was simplified.

<Measurement of Amount of Sulfate II>

The $CO_2$ recovery device of the second embodiment was used in Example 2. The concentration of the sulfate in the $CO_2$ absorption liquid in the absorption column was measured under the same conditions as those of Example 1. Using the measured value, the ratio of the amount of entrainment of the sulfate in Example 2 was evaluated in a similar way to Example 1 while defining the concentration (the amount of entrainment) of the sulfate in the $CO_2$ absorption liquid in Comparative Example 1 as 1. In Example 2, an amount of the dilution water flowing in from the dilution water supply line was set to 1:100 in terms of the ratio to the amount of circulation in the circulating line. A result of the evaluation is shown in FIG. 9.

Figure 9:
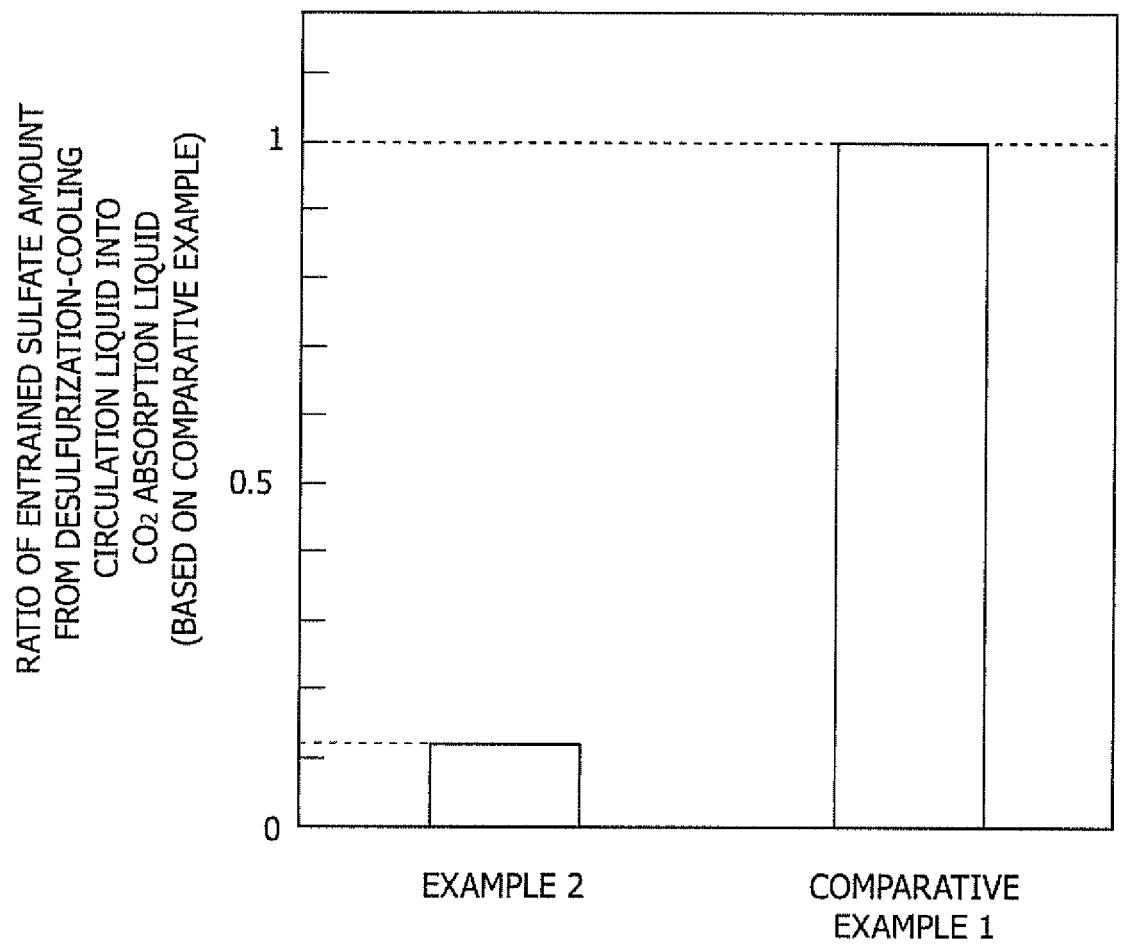
FIG. 9 is a diagram showing a result of Example 2 regarding the $CO_2$ recovery device and recovery method according to the present invention.

The result shown in FIG. 9 revealed that, according to the $CO_2$ recovery device and recovery method of Example 2, the ratio of the amount of entrainment of sodium sulfate into the $CO_2$ absorption liquid fell to about 0.1 relative to Comparative Example 1 and the amount of entrainment of sodium sulfate could thus be reduced to about 1/10. In other words, it turned out that the $CO_2$ recovery device and recovery method of Example 2 could reduce the concentration of the sulfate in the $CO_2$ absorption liquid by about 90% in comparison with Comparative Example 1. In this way, it turned out that the $CO_2$ recovery device and recovery method of Example 2 could reduce the amount of entrainment of the circulation liquid for the advanced desulfurization-cooling treatment into the $CO_2$ absorption liquid even when the structure of the device was simplified.

<Measurement of Amount of Sulfate III>

The $CO_2$ recovery device of the third embodiment was used in Example 3. The concentration of the sulfate in the $CO_2$ absorption liquid in the absorption column was measured under the same conditions as those of Example 1. Using the measured value, the ratio of the amount of entrainment of the sulfate in Example 3 was evaluated in a similar way to Example 1 while defining the concentration (the amount of entrainment) of the sulfate in the $CO_2$ absorption liquid in Comparative Example 1 as 1. The amount of circulation to the branched circulating line in Example 3 was set to 1:20 in terms of the ratio to the amount of circulation in the circulating line. In the meantime, the cooling temperature of the desulfurization-cooling circulation liquid in the circulating line with the second cooler was set to 35° C. A result of the evaluation is shown in FIG. 10.

Figure 10:
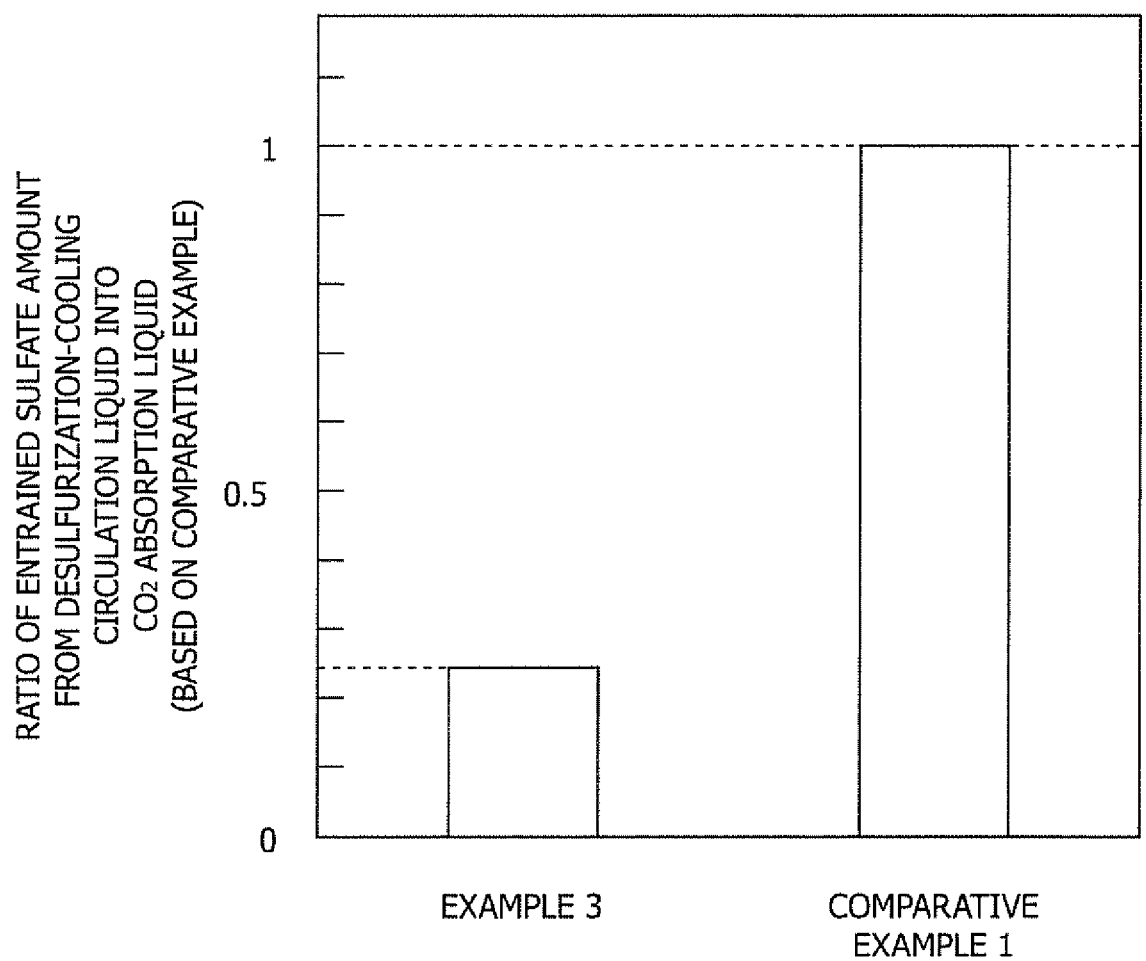
FIG. 10 is a diagram showing a result of Example 3 regarding the $CO_2$ recovery device and recovery method according to the present invention.

The result shown in FIG. 10 revealed that, according to the $CO_2$ recovery device and recovery method of Example 3, the ratio of the amount of entrainment of sodium sulfate into the $CO_2$ absorption liquid fell to about 0.25 relative to Comparative Example 1 and the amount of entrainment of sodium sulfate could thus be reduced to about 1/4. In other words, it turned out that the $CO_2$ recovery device and recovery method of Example 3 could reduce the concentration of the sulfate in the $CO_2$ absorption liquid by about 75% in comparison with Comparative Example 1. In this way, it turned out that the $CO_2$ recovery device and recovery method of Example 3 could reduce the amount of entrainment of the circulation liquid for the advanced desulfurization-cooling treatment into the $CO_2$ absorption liquid even when the structure of the device was simplified.

<Measurement of Amounts of Sulfate IV to VI>

The $CO_2$ recovery devices of the forth to sixth embodiments were used in Examples 4 to 6, respectively. The concentration of the sulfate in the $CO_2$ absorption liquid in the absorption column was measured under the same conditions as those of Example 1 by operating each of these devices. Regarding these results, the ratios of the amounts of entrainment of the sulfate in Examples 4 to 6 were investigated, respectively, in a similar way to Example 1 while defining the concentration (the amount of entrainment) of the sulfate in the $CO_2$ absorption liquid in Comparative Example 1 as 1. Operating conditions of Example 4 were set similar to those of Example 1, operating conditions of Example 5 were set similar to those of Example 2, and operating conditions of Example 6 were set similar to those of Example 1. These results are shown in FIG. 11.

Figure 11:
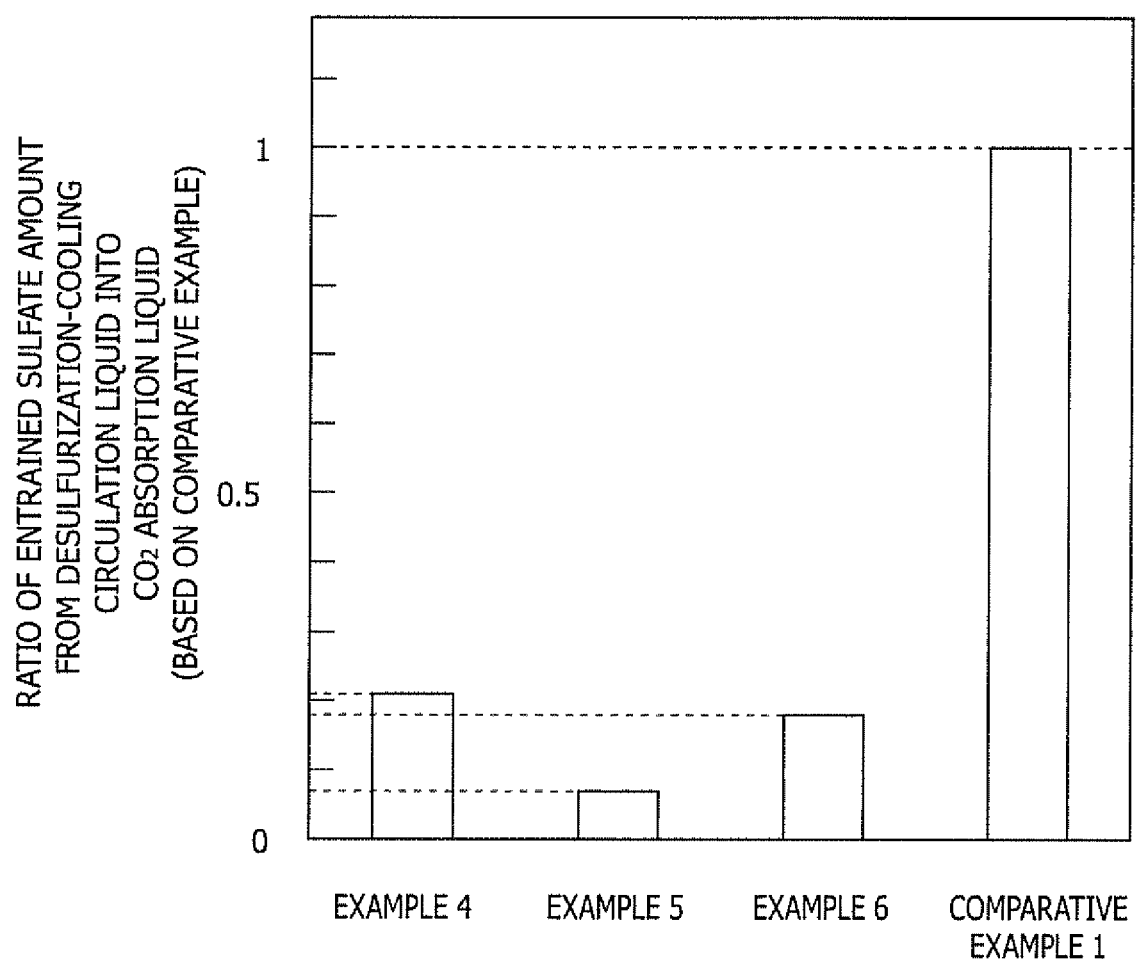
FIG. 11 is a diagram showing results of Examples 4 to 6 regarding the $CO_2$ recovery device and recovery method according to the present invention.

The results shown in FIG. 11 revealed that, according to the $CO_2$ recovery device and recovery method of Example 4, the ratio of the amount of entrainment of sodium sulfate into the $CO_2$ absorption liquid fell to about 0.2 relative to Comparative Example 1 and the amount of entrainment of sodium sulfate could thus be reduced to about 1/5. In other words, it turned out that the $CO_2$ recovery device and recovery method of Example 4 could reduce the concentration of the sulfate in the $CO_2$ absorption liquid by about 80% in comparison with Comparative Example 1. In this way, it turned out that the $CO_2$ recovery device and recovery method of Example 4 could reduce the amount of entrainment of the circulation liquid for the advanced desulfurization-cooling treatment into the $CO_2$ absorption liquid even when the structure of the device was simplified.

In addition, according to the $CO_2$ recovery device and recovery method of Example 5, the ratio of the amount of entrainment of sodium sulfate into the $CO_2$ absorption liquid fell below 0.1 relative to Comparative Example 1 and the amount of entrainment of sodium sulfate could thus be reduced to below 1/10. In other words, it turned out that the $CO_2$ recovery device and recovery method of Example 5 could reduce the concentration of the sulfate in the $CO_2$ absorption liquid by 90% or more in comparison with Comparative Example 1. In this way, it turned out that the $CO_2$ recovery device and recovery method of Example 5 could reduce the amount of entrainment of the circulation liquid for the advanced desulfurization-cooling treatment into the $CO_2$ absorption liquid even when the structure of the device was simplified.

Furthermore, according to the $CO_2$ recovery device and recovery method of Example 6, the ratio of the amount of entrainment of sodium sulfate into the $CO_2$ absorption liquid fell below 0.2 relative to Comparative Example 1 and the amount of entrainment of sodium sulfate could thus be reduced to below 1/5. In other words, it turned out that the $CO_2$ recovery device and recovery method of Example 6 could reduce the concentration of the sulfate in the $CO_2$ absorption liquid by about 80% or more in comparison with Comparative Example 1. In this way, it turned out that the $CO_2$ recovery device and recovery method of Example 6 could reduce the amount of entrainment of the circulation liquid for the advanced desulfurization-cooling treatment into the $CO_2$ absorption liquid even when the structure of the device was simplified.

INDUSTRIAL APPLICABILITY

According to the $CO_2$ recovery device and recovery method of the present invention, it is possible to simplify the structure of the device. In addition, it is possible to reduce the amount of entrainment of the circulation liquid for the advanced desulfurization-cooling treatment into the $CO_2$ absorption liquid.

REFERENCE SYMBOL LIST 10A, 10B, 10C, 10D, 10E, 10F advanced desulfurization-cooling column
11 advanced desulfurization-cooling packed bed
12 deep $SO_x$ recovery packed bed
13 first demister
14 first cooler
15 second cooler
16 second demister
20 $CO_2$ absorption column
21*a* $CO_2$ absorption unit
31*a* lower packed bed
21*b* water washing unit 31b upper packed bed
21c washing liquid collector
23, 33, 32 cooler
30 regeneration column
31c absorption liquid collector
32 reboiler
34 gas-liquid separator
35 heat exchanger
$L_1$ circulating line
$L_{11}$ alkaline compound supply line
$L_{12}$ circulation liquid discharge line
$L_{13}$ dilution water supply line
$L_{15}$ branched circulating line

The invention claimed is:

1. A $CO_2$ recovery device comprising:
   an advanced desulfurization-cooling column configured to remove sulfur oxides in an exhaust gas and to reduce a temperature of the exhaust gas;
   a $CO_2$ absorption column configured to remove $CO_2$ in the exhaust gas by bringing the $CO_2$ into contact with a $CO_2$ absorption liquid; and
   a regeneration column configured to recover the $CO_2$ by causing the $CO_2$ absorption liquid to release the $CO_2$ while regenerating the $CO_2$ absorption liquid, and to feed the regenerated $CO_2$ absorption liquid to the $CO_2$ absorption column,
   wherein
   the advanced desulfurization-cooling column comprises:
      a circulating line configured to supply and circulate a desulfurization-cooling circulation liquid used in order to conduct desulfurization and cooling from a lower part to an upper part of the advanced desulfurization-cooling column,
      a deep $SO_x$ recovery packed bed located above a connection position between the circulating line and an upper part of the advanced desulfurization-cooling column,
      a first demister located above the deep $SO_x$ recovery packed bed, and
      a first cooler configured to cool the circulation liquid, and
   the advanced desulfurization-cooling column directly mixes a liquid flowing down from the deep $SO_x$ recovery packed bed with the circulation liquid from the circulating line.

2. The $CO_2$ recovery device according to claim 1, wherein the advanced desulfurization-cooling column comprises a dilution water supply line located above the deep $SO_x$ recovery packed bed and configured to supply water from outside.

3. The $CO_2$ recovery device according to claim 1, wherein the advanced desulfurization-cooling column further comprises a branched circulating line coupled to a portion of the circulating line downstream of the first cooler and configured to supply part of the circulation liquid to a section above the deep SOx recovery packed bed and below the first demister, and wherein the branched circulating line comprises a second cooler configured to cool the part of the circulation liquid.

4. The $CO_2$ recovery device according to claim 1, wherein the advanced desulfurization-cooling column comprises a second demister located between a circulation liquid supply position at the upper part of the circulating line and the deep $SO_x$ recovery packed bed.

5. The $CO_2$ recovery device according to claim 2, wherein the circulating line further comprises an alkaline compound supply line coupled to a portion downstream of a junction with the first cooler.

6. The $CO_2$ recovery device according to claim 1, wherein the circulating line further comprises an excess liquid discharge line coupled to a portion upstream of the first cooler.

7. The $CO_2$ recovery device according to claim 3, wherein the circulating line further comprises an alkaline compound supply line coupled to a portion downstream of a junction with the branched circulating line.

8. A $CO_2$ recovery method of applying the $CO_2$ recovery device according to claim 1, comprising:
   an advanced desulfurization-cooling step of removing the sulfur oxides in the exhaust gas and reducing the temperature of the exhaust gas;
   a $CO_2$ absorbing step of removing the $CO_2$ in the exhaust gas by bringing the $CO_2$ into contact with the $CO_2$ absorption liquid; and
   a regeneration step of recovering the $CO_2$ by causing the $CO_2$ absorption liquid to release the $CO_2$ while regenerating the $CO_2$ absorption liquid, and to feed the regenerated $CO_2$ absorption liquid to the $CO_2$ absorption column to reuse the regenerated $CO_2$ absorption liquid, wherein
   the advanced desulfurization-cooling step further includes
      a circulating step of supplying and circulating the desulfurization-cooling circulation liquid used in order to conduct the desulfurization and the cooling from the lower part to the upper part of the advanced desulfurization-cooling column, and a mixing step of directly mixing the liquid flowing down from the deep $SO_x$ recovery packed bed, which is located above the connection position between the circulating line and the upper part of the advanced desulfurization-cooling column, with the circulation liquid from the circulating line, and
      a step of removing and recovering mist of the desulfurization-cooling circulation liquid entrained with the exhaust gas, and accumulating mist at a bottom part of the advanced desulfurization-cooling column, in the first demister.

* * * * *